United States Patent [19]
Wahnschaffe et al.

[11] 3,800,526
[45] Apr. 2, 1974

[54] HOT GAS ENGINE CONSTRUCTED AS ROTARY PISTON ENGINE

[75] Inventors: Jurgen Wahnschaffe, Cologne; Dietrich Gwinner, Waiblingen; Konstantin Pattas, Stuttgart; Eberhard Braun, Waiblingen, all of Germany

[73] Assignee: Daimler-Benz Aktiengesellschaft, Stuttgart-Untertuerkheim, Germany

[22] Filed: Mar. 29, 1971

[21] Appl. No.: 128,721

[30] Foreign Application Priority Data
Apr. 3, 1970 Germany............................. 2015949

[52] U.S. Cl............................................. 60/519
[51] Int. Cl. ............................................. F02g 1/04
[58] Field of Search............................... 60/24; 62/6

[56] References Cited
UNITED STATES PATENTS

| | | | |
|---|---|---|---|
| 2,067,453 | 1/1937 | Lee | 60/24 X |
| 3,157,024 | 11/1964 | McCrory et al. | 60/24 |
| 3,426,525 | 2/1969 | Rubin | 60/24 |
| 3,460,344 | 8/1969 | Johnson | 60/24 |
| 3,483,694 | 12/1969 | Huber et al. | 60/24 |
| 3,487,424 | 12/1969 | Leger | 62/6 |

*Primary Examiner*—Edgar W. Geoghegan
*Assistant Examiner*—Allen M. Ostrager
*Attorney, Agent, or Firm*—Craig and Antonelli

[57] ABSTRACT

A hot gas engine in the form of a rotary piston internal combustion engine of trochoidal type of construction in which one or several pairs of working chambers of the rotary piston engine serve as warm and cold spaces of the hot gas engine which are connected with one another.

22 Claims, 1 Drawing Figure

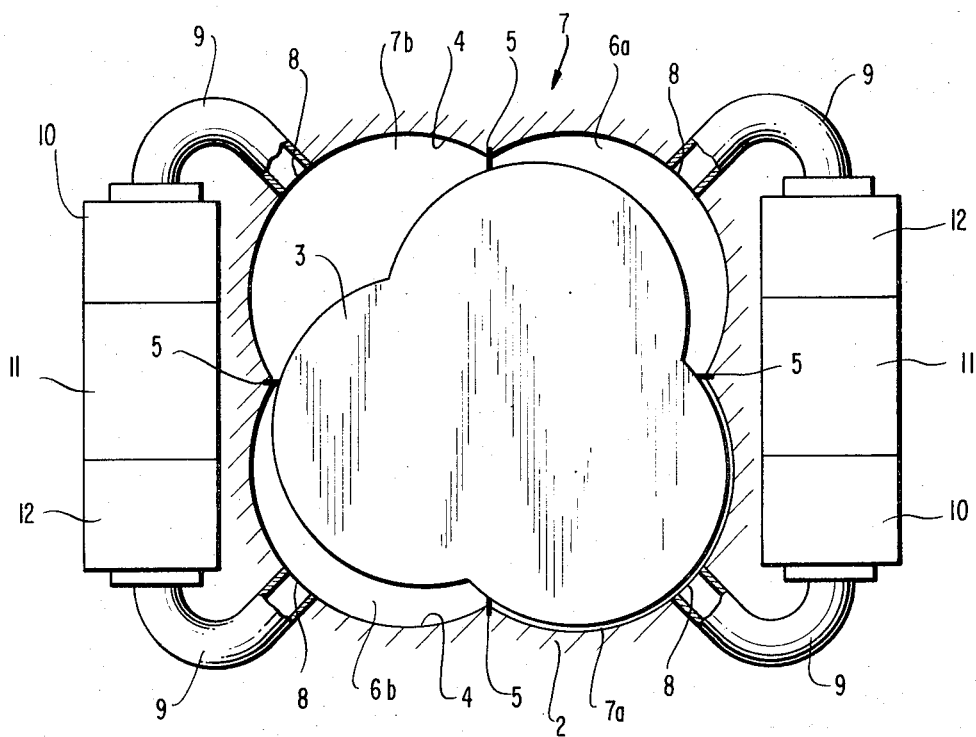

HOT GAS ENGINE CONSTRUCTED AS ROTARY PISTON ENGINE

The present invention relates to a hot gas engine constructed as rotary piston engine of trochoidal construction, especially as hot gas motor.

The present invention aims at realizing the hot gas process having multi-fuel capability and noise-free operation by means of a rotary piston engine and at providing an engine compared to the hot gas engines known heretofore which is improved and on the basis of its compact construction achieves a considerably higher output due to the slight weight and/or slight structural volume.

The underlying problems are solved according to the present invention in that one or several pairs of working chambers of the rotary piston engine serve as hot and cold spaces, connected with each other, of the hot gas engine.

In an advantageous construction of the present invention, the piston may be provided with an odd (2 n − 1) number of arcs of epitrochoidal construction and the case housing forming working chambers together with the piston may be provided with a running or contact surface which is provided as external envelope with an even (2n) number of arcs.

According to the present invention, the rotary piston engine may include a triangular piston having three arcs of epitrochoidal construction which rotates within a stationary housing casing constructed as external envelope, and in that the cold and warm spaces arranged respectively in the rotary piston engine are disposed mutually opposite one another offset by 180°.

The arrangement of the rotary piston engine described above makes it possible that during one complete rotation of the triangularly constructed piston, the closed thermodynamic cycle is realized six times with a single engine.

In a preferred embodiment of the present invention, a heat-exchanger provided as heater, a regenerator and a heat-exchanger provided as cooler may be arranged in this sequence, interconnected between a warm and the associated cold working space.

Accordingly, it is an object of the present invention to provide a hot gas engine which avoids the aforementioned shortcomings and draw-backs by simple means.

Another object of the present invention resides in a hot gas engine which not only obviates the need for reciprocating parts, but also assures improved operation and satisfies all requirements as regards sealing ability.

Still another object of the present invention resides in a hot gas engine constructed as rotary piston engine of trochoidal construction which enables improved efficiency with reduced wear in the mechanical parts.

Another object of the present invention resides in a hot gas engine of the type described above which fulfills by simple means the requirements as regards compression and power density of the involved thermodynamic process.

These and further objects, features and advantages of the present invention will become more obvious from the following description when taken in connection with the accompanying drawing which shows, for purposes of illustration only, one embodiment in accordance with the present invention, and wherein:

The single FIGURE is a schematic view of a hot gas engine in accordance with the present invention.

Referring now to the single FIGURE of the drawing, a rotary piston engine generally designated by reference numeral 1 and provided for the hot gas operation consists of a stationary casing housing 2 having four arcs and constructed as external envelope and of a piston 3 with three arcs of epitrochoidal construction and rotating within the casing housing 2. The piston 3 and its eccentric shaft (not shown) on which the piston is rotatably supported in a conventional manner, rotate in opposite direction whereby the eccentric shaft rotates three times as fast as the piston 3 as is known for such rotary piston engines. Four sealing bars 5 are arranged at the circumference of the casing engaging surface 4, which delimit two breathing spaces, respectively, provided as hot gas chambers and cold gas chambers, whereby the cold spaces 6a and 6b and the warm spaces 7a and 7b are disposed diagonally opposite one another, respectively. The cold spaces 6a and 6b and the warm spaces 7a and 7b are connected with each other by way of openings 8 in the casing contact surface 4 and by way of the pipe lines 9 under interposition of a heater 10, a regenerator 11 and a cooler 12 all of any conventional construction. The openings 8 provided for the breathing spaces may be arranged possibly also in the lateral parts or housing walls of the rotary piston engine, not illustrated in the single FIGURE, in lieu of being provided in the contact or running surface 4 as shown in the drawing.

OPERATION

The operation and functioning of the hot gas engine as rotary piston engine is as follows:

The piston 3 rotating in the clockwise direction as viewed in the drawing compresses and displaces the working medium contained in the circulatory system within the cold space 6a. During this displacement, the working medium flows through a cooler 12, a regenerator 11 and a heater 10 and then reaches by way of the pipe line 9 the warm space 7a where it expands and produces work. A gain in work is achieved in that the compression takes place at a lower temperature level than the expansion, the adjacent spaces 6a and 7a operate phase-displaced by 90° eccentric shaft angle, and the hot gas chamber leads the cold gas chamber by 90°. If the piston 3 continues to rotate in the direction of rotation thereof, the gas flows in the reverse direction through the heater 10, the regenerator 11, and the cooler 12. The regenerator 11, a space filled with a material capable of storing heat and of convention construction, absorbs heat from the working medium flowing through the same and again gives off heat to the cold working medium flowing in the opposite direction.

This closed thermodynamic cycle which repeats itself on the opposite side of the rotary piston engine in the spaces 6b and 7b under corresponding phase displacement, is realized by means of the three-arched piston during a rotary movement of 120° in the circumferential direction.

While we have shown and described only one embodiment in accordance with the present invention, it is understood that the same is not limited thereto, but is susceptible of numerous changes and modifications as known to those skilled in the art, and we therefore do not wish to be limited to the details shown and de-

We claim:
1. A hot gas engine:
   a chamber,
   a polygonal piston rotatably mounted in said chamber, a working medium disposed in said chamber, said chamber and said piston delimiting first and second cold working chamber spaces and first and second warm working chamber spaces,
   first line means operatively interconnecting said first cold chamber space with said first warm chamber space such that at least a portion of the working medium is communicated from said first cold chamber space to said first warm chamber space during part of the rotation of the piston and from said first warm chamber space to said first cold chamber space during another part of the rotation of the piston,
   and second line means operatively interconnecting said second cold chamber space with said second warm chamber space such that at least a portion of the working medium is communicated from said second cold chamber space to said second warm chamber space during part of the rotation of the piston and from said second warm chamber space to said second cold chamber space during another part of the rotation of the piston.
2. An engine according to claim 1, wherein a cooler means, a regenerator means and a heater means are serially arranged in said first line means with said cooler means being closest to said first cold chamber space.
3. An engine according to claim 1, wherein a cooler means, a regenerator means and a heater means are arranged in each of the first and second line means with said respective cooler means being closest to said respective cold chamber spaces.
4. An engine according to claim 1, wherein the piston is of eiptrochoidal shape with an odd number of arcs, wherein said chamber has an even number of arcs formed in the walls thereof and wherein said respective chamber spaces are delimited on the outside by respective arcs of said chamber.
5. An engine according to claim 4, wherein the number of arcs of the piston is $2n-1$ and the number of arcs of said chamber is $2n$.
6. An engine according to claim 5, wherein the piston has three arcs, wherein the chamber has four arcs, wherein two of said chamber arcs delimit said first cold and warm chamber spaces while the other two of said chamber arcs said second cold and warm chamber spaces.
7. An engine according to claim 6, wherein a cooler means, a regenerator means and a heater means are arranged in each of the first and second line means with said respective cooler means being closest to said respective cold chamber spaces.
8. An engine according to claim 1, wherein said first cold chamber space and said first warm chamber space are spaced 90° from one another around the circumference of the chambers.
9. An engine according to claim 3, wherein said first cold chamber space and said first warm chamber space are spaced 90° from one another around the circumference of the chambers, and wherein said second cold chamber space is spaced 90° from each of said first and second warm chamber spaces and 180° from said first cold chamber space, whereby six complete closed thermodynamic cycles are realized upon each complete rotation of the piston.
10. An engine according to claim 7, wherein said first cold chamber space and said first warm chamber space are spaced 90° from one another around the circumference of the chambers, and wherein said second cold chamber space is spaced 90° from each of said first and second warm chamber spaces and 180° from said first cold chamber space, whereby six complete closed thermodynamic cycles are realized upon each complete rotation of the piston.
11. An engine according to claim 7, wherein said chamber is bounded by chamber walls, and wherein said first line means is so constructed that, during a single revolution of the piston with respect to respective walls forming said chamber, the flow of working medium through said first line means reverses directions at least once.
12. An engine according to claim 1, wherein said chamber is bounded by chamber walls, and wherein said first line means is so constructed that, during a single revolution of the piston with respect to respective walls forming said chamber, the flow of working medium through said first line means and associated cooler means, regenerator means, and heater means reverses directions at least once.
13. An engine according to claim 1, wherein said chamber is bounded by chamber walls, and wherein said first and second line means are so constructed that, during a single revolution of the piston with respect to respective chamber walls, the flow of working medium through each of said first and second line means reverses directions at least once.
14. An engine according to claim 3, wherein said chamber is bounded by chamber walls, wherein said first and second line means are so constructed that, during a single revolution of the piston with respect to respective chamber walls, the flow of working medium through each of said first and second line means and associated respective cooler means, regenerator means, and heater means, reverses directions at least once.
15. An engine according to claim 14, wherein said first cold chamber space and said first warm chamber space are spaced 90° from one another around the circumference of the chambers, and wherein said second cold chamber space is spaced 90° from each of said first and second warm chamber spaces and 180° from said first cold chamber space, whereby six complete closed thermodynamic cycles are realized upon each complete rotation of the piston.
16. An engine according to claim 1, wherein only one chamber with only one polygonal piston is provided.
17. An engine according to claim 11, wherein only one chamber with only one polygonal piston is provided.
18. An engine according to claim 12, wherein only one chamber with only one polygonal piston is provided.
19. An engine according to claim 14, wherein only one chamber with only one polygonal piston is provided.
20. An engine according to claim 3, wherein said chamber, said first and second line means, and said respective cooler means, regenerator means, and heater means form a closed system for the working medium.

21. An engine according to claim 14 wherein said chamber, said first and second line means, and said respective cooler means, regenerator means, and heater means form a closed system for the working medium.

22. An engine according to claim 15, wherein said chamber, said first and second line means, and said respective cooler means, regenerator means, and heater means form a closed system for the working medium.

* * * * *